(12) United States Patent
Fossum et al.

(10) Patent No.: US 7,362,330 B2
(45) Date of Patent: Apr. 22, 2008

(54) ADAPTIVE SPAN COMPUTATION WHEN RAY CASTING

(75) Inventors: Gordon Clyde Fossum, Austin, TX (US); Barry L Minor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 11/226,964

(22) Filed: Sep. 15, 2005

(65) Prior Publication Data

US 2007/0057968 A1 Mar. 15, 2007

(51) Int. Cl.
*G06T 15/50* (2006.01)

(52) U.S. Cl. ............................................. 345/426
(58) Field of Classification Search ............... 345/426
See application file for complete search history.

(56) References Cited

U.S. PATENT DOCUMENTS

| | | | | |
|---|---|---|---|---|
| 5,579,456 | A | * | 11/1996 | Cosman ..................... 345/419 |
| 5,594,842 | A | * | 1/1997 | Kaufman et al. ........... 345/424 |
| 5,684,935 | A | * | 11/1997 | Demesa et al. ............ 345/419 |
| 5,760,781 | A | * | 6/1998 | Kaufman et al. ........... 345/424 |
| 5,847,711 | A | * | 12/1998 | Kaufman et al. ........... 345/424 |
| 6,028,608 | A | * | 2/2000 | Jenkins ....................... 345/619 |
| 6,097,394 | A | * | 8/2000 | Levoy et al. ................ 345/419 |
| 6,433,792 | B1 | * | 8/2002 | Yaron et al. ................ 345/669 |
| 6,441,816 | B1 | * | 8/2002 | Nguyen et al. ............. 345/420 |
| 6,664,961 | B2 | * | 12/2003 | Ray et al. ................... 345/424 |
| 6,674,430 | B1 | * | 1/2004 | Kaufman et al. ........... 345/419 |
| 7,212,199 | B2 | | 5/2007 | Fossum et al. |
| 7,262,768 | B2 | * | 8/2007 | Woodbury et al. ......... 345/420 |

OTHER PUBLICATIONS

Lee et al ("A Terrain Rendering Method Using Vertical Ray Coherence" Journal of Visualizaiton and Computer Animation, vol. 8: 97-114, 1997).*

* cited by examiner

*Primary Examiner*—Xiao Wu
*Assistant Examiner*—Edward T La Barr
(74) *Attorney, Agent, or Firm*—Van Leeuwen & Van Leeuwen; D'Ann N. Rifai

(57) ABSTRACT

A processor uses start point fractional values during view screen segment computations that start a view screen segment's computations a particular distance away from a down point. This prevents an excessive sampling density during image generation without wasting processor resources. The processor identifies a start point fractional value for each view screen segment based upon each view screen segment's identifier, and computes a view screen segment start point for each view screen segment using the start point fractional value. View screen segment start points are "tiered" and are a particular distance away from the down point. This stops the view screen segments from converging to a point of severe over sampling while, at the same time, providing a pseudo-uniform sampling density.

6 Claims, 8 Drawing Sheets

| View Screen Segment Identifier | Start Point Fractional Value | |
|---|---|---|
| 0000 | 0 | 315 |
| 0001 | 50% | 320 |
| 0010 | 25% | 325 |
| 0011 | 50% | 330 |
| 0100 | 12.5% | 335 |
| 0101 | 50% | 340 |
| 0110 | 25% | 345 |
| 0111 | 50% | 350 |
| 1000 | 0 | 355 |
| 1001 | 50% | 360 |
| 1010 | 25% | 365 |
| 1011 | 50% | 370 |
| 1100 | 12.5% | 375 |
| 1101 | 50% | 380 |
| 1110 | 25% | 385 |
| 1111 | 50% | 390 |
| ... | ... | |

300

| View Screen Segment Identifier | Start Point Fractional Value | |
|---|---|---|
| 0000 | 0 | 315 |
| 0001 | 50% | 320 |
| 0010 | 25% | 325 |
| 0011 | 50% | 330 |
| 0100 | 12.5% | 335 |
| 0101 | 50% | 340 |
| 0110 | 25% | 345 |
| 0111 | 50% | 350 |
| 1000 | 0 | 355 |
| 1001 | 50% | 360 |
| 1010 | 25% | 365 |
| 1011 | 50% | 370 |
| 1100 | 12.5% | 375 |
| 1101 | 50% | 380 |
| 1110 | 25% | 385 |
| 1111 | 50% | 390 |
| . . . | . . . | |

FIG. 3

ADAPTIVE SPAN COMPUTATION WHEN RAY CASTING

BACKGROUND OF THE INVENTION

1. Technical Field

The present invention relates to a system and method for adaptive span computation when ray casting. More particularly, the present invention relates to a system and method for using start point fractional values during view screen segment computations in order to prevent excessive sampling densities during image generation.

2. Description of the Related Art

The increase of computer system processing speeds has allowed today's computer systems to perform fairly accurate terrain rendering. In the computer gaming industry, for example, three dimensional terrain rendering is an essential element for providing a "visual reality" to computer games. In addition to the gaming industry, three-dimensional terrain rendering is utilized in other fields, such as in flight simulation.

Software developers may use "ray casting" for terrain rendering, which produces realistic images. In ray casting, a processor identifies an eye point location, which corresponds to a location at which a user views a view screen. Using the eye point location, the processor derives a down point, which is a point on a height map. Vertical half-planes are then projected from a line connecting the eye point and the down point. Each such vertical half-plane "slices" both the view screen and the height map. The slice in the view screen is called a "view screen segment" and the slice in the height map is called a "height map intersection contour."

The number of view screen segments that originate at the down point depend upon the required sampling density at the top of the view screen. For example, if the sampling density is 0.9 pixels, a particular number of view screen segments are projected out from the down point such that, when they reach the view screen edge, they are 0.9 pixels apart.

A challenge found is that since the view screen segments originate at the down point, the view screen segments are extremely close together in proximity to the down point. In turn, a processor severely over samples around the down point, which results in wasted processor resources. Using the example described above, in order to have the rays 0.9 pixels apart at the view screen edge, the rays may be 0.025 pixels apart around the down point.

What is needed, therefore, is a system and method to dynamically alter the start point of the view screen segments in order to prevent excessive over sampling.

SUMMARY

It has been discovered that the aforementioned challenges are resolved using a system and method for using start point fractional values during view screen segment computations that start the view screen segment computations a particular distance away from a down point, which prevents excessive sampling densities during image generation. A processor identifies a start point fractional value for each view screen segment based upon each view screen segment's identifier, and computes a view screen segment start point for each view screen segment using the start point fractional value. View screen segment start points are "tiered" and are a particular distance away from the down point, which stops the view screen segments from converging to a point of excessive over sampling.

A processor identifies a total number of start point fractional values, which correspond to the distance from the down point to the view screen edge. For example, if "A" is the location of the down point in the plane of the view screen, and "B" is the location at the top of the view screen where the view screen segment ends, then a 25% start point fractional value is computed as "A" +0.25*("B"-"A"). The processor then determines the number of start point fractional values that are within the view screen. For example, if the processor determines that there are four start point fractional values between the top of the view screen and the down point, but the fourth start point fractional value is below the bottom of the view screen, the processor does not use the fourth start point fractional value for its computations.

Once the start point fractional values are determined, the processor selects a view screen segment to process. The view screen segment has a corresponding identifier that signifies the placement of the view screen segment relative to other view screen segments. For example, moving from left to right along a view screen, the first view screen segment identifier may be "0," the second view screen segment identifier may be "1," the third view screen segment identifier may be "2," and so on. Processing uses the identifier to select a start point fractional value for use in computing the view screen segment's start point. For example, if the view screen segment identifier includes a "1" in its last bit, processing assigns a 50% start point fractional value, which corresponds to a distance 50% away from the down point relative to the view screen edge.

Once processing selects a start point fractional value, processing computes a start point fractional distance by multiplying the start point fractional value with the distance between the down point and the view screen edge. For example, if the down point is at an XY location of (10,10) and the view screen edge corresponding to the view screen segment is at an XY location of (10,60), the distance between the two is (0,50). Continuing with this example, if the view screen segment start point fractional value is 50%, the computed start point fractional value is (0,25). Processing then calculates the view screen segment start point by adding the start point fractional distance to the down point location. Continuing with this example, processing adds (0,25) to (10,10), which results in a view screen segment start point of (10,35).

Once processing computes the view screen segment start point, processing collects image data for the view screen segment starting at the view screen segment start point. Since view screen segment start points are computed based upon each view screen segment identifier, the view screen segments do not converge to a point of severe over sampling, while at the same time, provide an adequate sampling density throughout the view screen.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 3 is an example of a table showing start point fractional values that correspond to view screen segment identifiers;

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
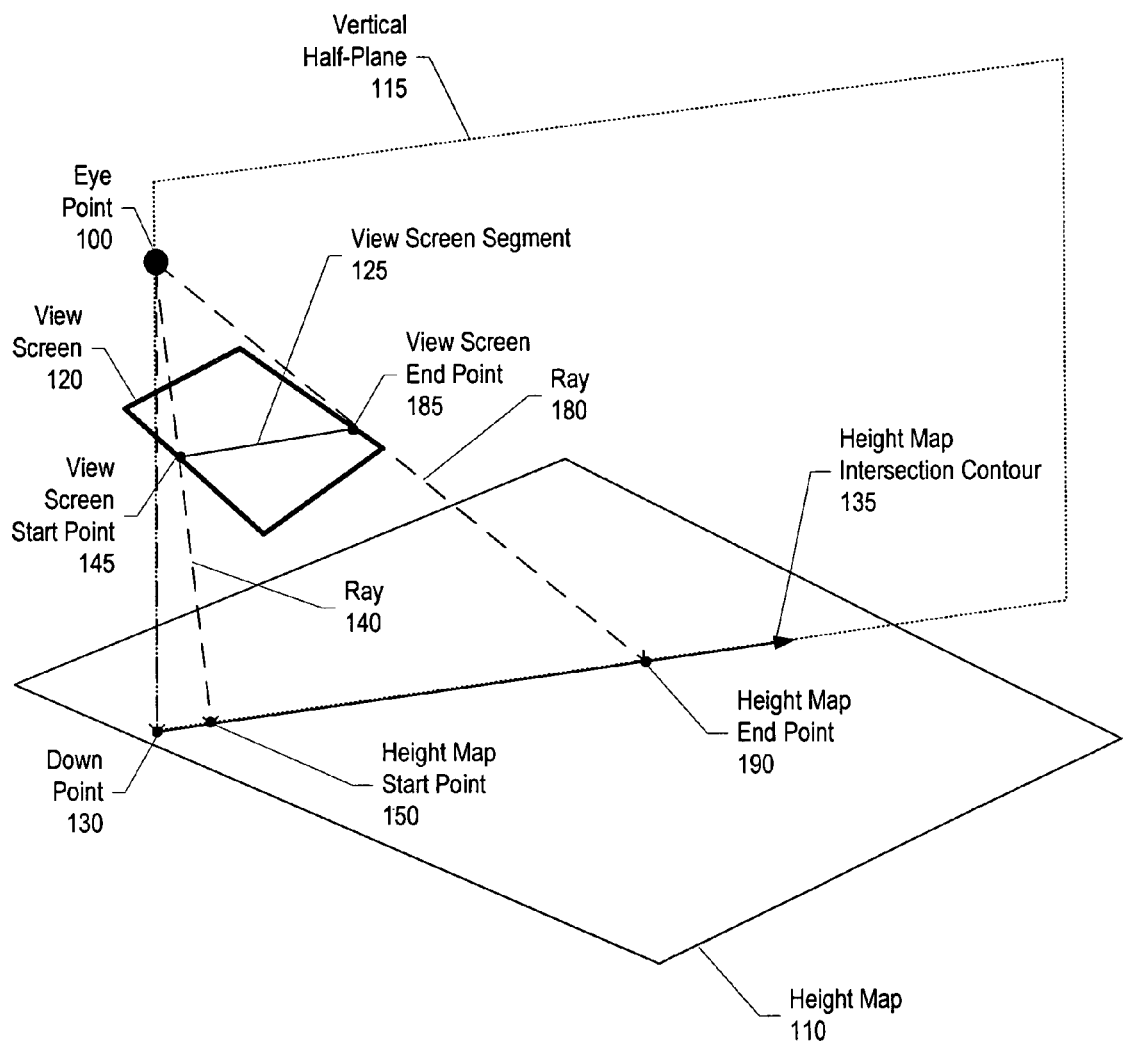
FIG. 1 is a diagram showing a plurality of rays that originate from an eye point, tracing through a view screen, and intersecting a height map.

FIG. 1 is a diagram showing a plurality of rays that originate from an eye point, tracing through a view screen, and intersecting a height map. A processor generates images that correspond to the height map intersections using a limited memory footprint. Height map 110 includes a plurality of data points that are organized by a grid, whereby each data point includes height data.

During terrain rendering, a processor identifies eye point 100, which corresponds to a location at which a user views view screen 120. Using eye point 100, the processor derives the location of down point 130, which may land either on or off height map 110. In addition, the processor derives view screen 120, such as its location from eye point 100, its size, and its angle relative to height map 110.

Once the processor derives view screen 120, the processor selects a vertical plane sampling density and identifies a list of interesting vertical half planes, such as vertical half-plane 115. An interesting vertical half plane is a half-plane that is perpendicular to height map 110, travels through down point 130, and travels through view screen 120. View screen segment 125 corresponds to the location that vertical half-plane 115 intersects view screen 120, and height map intersection contour 135 corresponds to the location where vertical half-plane intersects height map 110.

The processor uses view screen segment 125 and eye point 100 to identify a memory footprint starting point and a memory footprint ending point that corresponds to height map intersection contour 135. The processor generates ray 140 which originates at eye point 100, travels through view screen segment 125 at view screen start point 145, and intersects height map 110 along height map intersection contour 135 at height map start point 150. Data below view screen start point 145 is inconsequential to generating a view in the particular example shown in FIG. 1. The invention described herein discloses moving particular view screen segment start points further away from down point 130 in order prevent an excessive sampling density (see FIGS. 2B, 3-6, and corresponding text for further details).

The processor generates ray 180 which originates at eye point 100, travels through view screen segment 125 at view screen end point 185, and intersects height map 110 along height map intersection contour 135 at height map end point 190. Data above end point 190 is inconsequential to generating a view in the particular example shown in FIG. 1. If end point 190 falls outside of height map 110, the processor uses visibility settings (i.e. cloud coverage) in order to generate images between the end of height map 110 and end point 190 along height map intersection contour 135.

Once view screen start point 145 and end point 190 are identified, the processor collects data points that are adjacent to height map intersection contour 135 and between start point 150 and end point 190, creating a memory footprint subset. In turn, the processor generates an image for view screen segment 125 on view screen 120 using the collected data points.

Figure 2A:
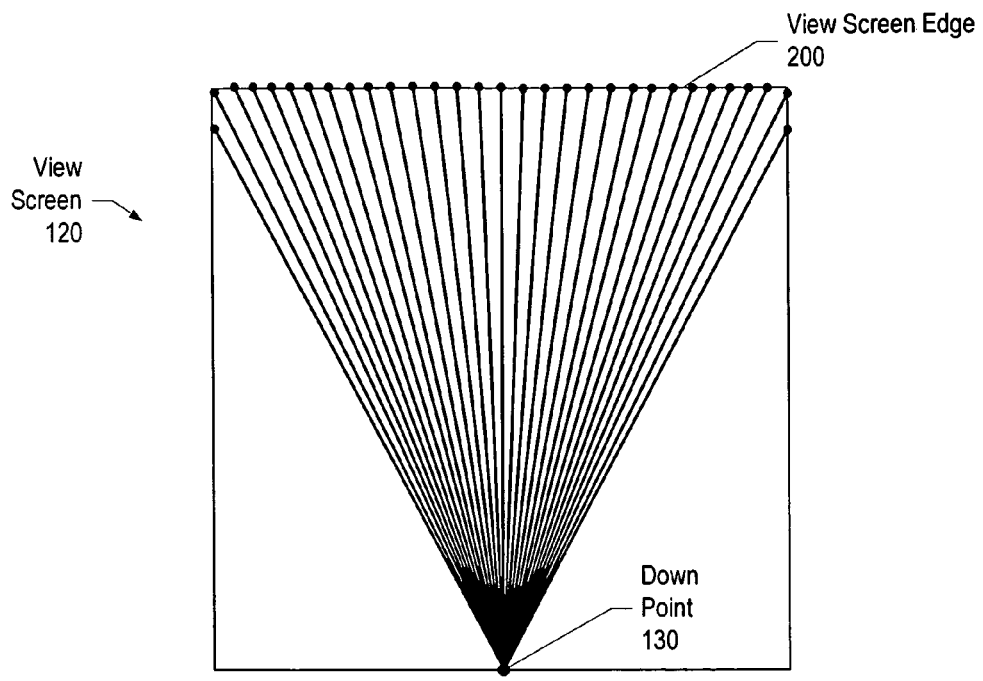
FIG. 2A is a diagram showing a plurality of view screen segments originating at a down point.

FIG. 2A is a diagram showing a plurality of view screen segments originating at a down point. View screen 120 includes a plurality of view screen segments, each corresponding to a vertical half-plane. The view screen segments originate at down point 130. The example in FIG. 2A shows that down point 130 is at the bottom of view screen 120, which corresponds to a situation when a user is viewing a scene almost straight down. View screen 120 and down point 130 are the same as that shown in FIG. 1.

The view screen segments produce a particular sampling density at view screen edge 200. However, as the view screen segments converge towards down point 130, a processor ends up wasting resources because the processor over samples to a point that produces no benefit. Therefore, one aspect of the invention described herein identifies start point fractional values that a processor uses to compute view screen segment start points. View screen segment start points are points at which a processor starts collecting data for a particular view screen segment in order to prevent an excessive sampling density (see FIG. 2B and corresponding text for further details).

Figure 2B:
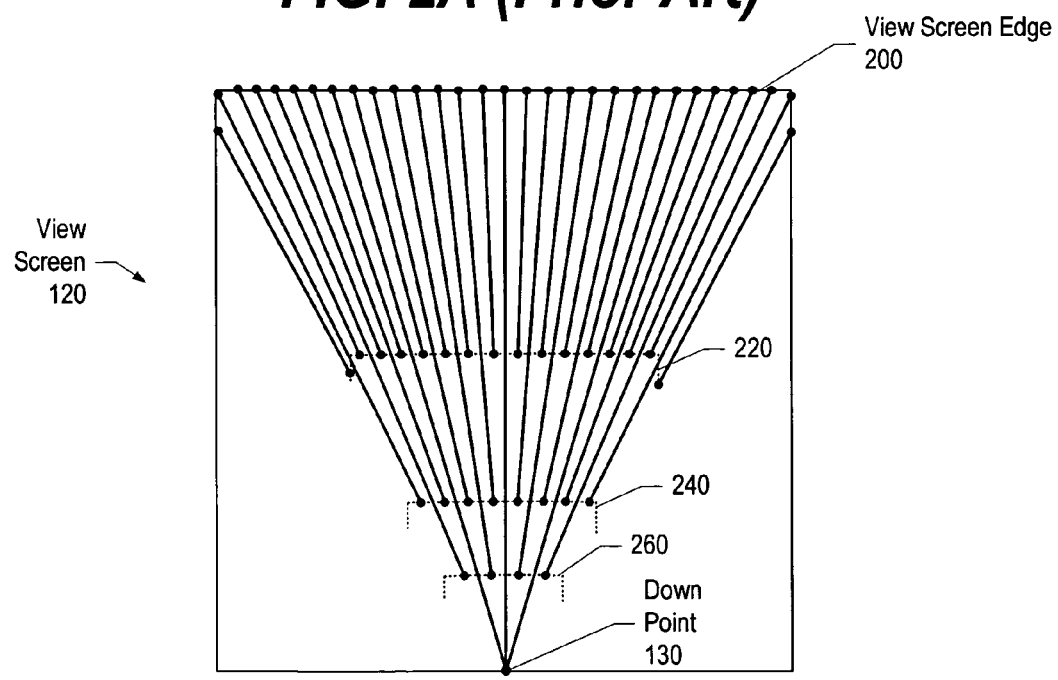
FIG. 2B is a diagram showing a plurality of view screen segments whose start point is based upon particular start point fractional values that prevents an excessive sampling density.

FIG. 2B is a diagram showing a plurality of view screen segments whose start point is based upon particular start point fractional values that prevents an excessive sampling density. FIG. 2B includes view screen 120, view screen edge 200, and down point 130, which are the same as that shown in FIG. 2A.

View screen 120 includes a plurality of view screen segments, such as those shown in FIG. 2A. However, FIG. 2B shows three view screen segment start point locations, which are locations 220, 240, and 260. The three start point locations correspond to three start point fractional values that reduce the view screen segment sampling density as the view screen segments converge at down point 130. As can be seen, half of the view screen segments start at location 220, which is half the distance between view screen edge 200 and down point 130. At this point, the sampling density doubles compared to the sampling density at view screen edge 200 and, therefore, half the view screen segments may start at this point in order to prevent an excessive sampling density.

At location 240, which is half the distance between termination point 220 and down point 130, the sampling density doubles again. Therefore, one fourth of the view screen segments may start at location 240. And, at location 260, which is half the distance between termination point 240 and down point 130, the sampling density doubles once again. Therefore, one eighth of the view screen segments may start at location 260.

When down point 130 does not reside within view screen 120, processing identifies which start point fractional values correspond to locations within view screen 120. For example, if down point 130 was "below" the bottom of view screen 120 to a point that location 260 did not fall within view screen 120, processing does not use the start point fractional value that corresponds to location 260 in its computations (see FIG. 4 and corresponding text for further details).

FIG. 3 is a table showing start point fractional values that correspond to view screen segment identifiers. A programmer may generate an index table identifying a view screen segment's start point fractional value (e.g. table 300), or the programmer may generate a subroutine that determines the view screen segment's start point fractional value while the view screen segment is being processed (see FIG. 5 and corresponding text for further details regarding view screen segment processing).

The example in FIG. 3 corresponds to a processor using three start point fractional values for determining view screen segment start points. The three start point fractional values are 50%, 25%, and 12.5%, which correspond to a view screen segment's starting point relative to the distance between a down point and a view screen edge. Meaning, the 50% start point fractional value corresponds to a starting point 50% of the distance from the down point to the view screen edge, such as location 220 shown in FIG. 2. The 25% start point fractional value corresponds to a starting point 25% of the distance from the down point to the view screen edge, such as location 240 shown in FIG. 2. And, the 12.5% start point fractional value corresponds to a starting point 12.5% of the distance from the down point to the view screen edge, such as location 260 shown in FIG. 2.

Table 300 includes two columns, which are column 305 and column 310. Column 305 includes the last four bits of each view screen segment identifier, and column 310 includes corresponding start point fractional values. The view screen segment identifier identifies the relative location of the view screen segments. For example, moving from left to right along a view screen, the first view screen segment identifier may be "0,", the second view screen segment identifier may be "1," the third view screen segment identifier may be "2," and so on. In this example, since there are three start point fractional values, processing selects a particular fractional value for a view screen segment based upon the last three bits of the view screen segment's identifier.

Processing first checks the last bit of a view screen segment identifier. If the last bit is a "1," processing assigns a 50% start point fractional value to the view screen segment. Therefore, every other view screen segment has a 50% start point fractional value, which is shown in rows 320, 330, 340, 350, 360, 370, 380, and 390.

Next, processing checks the second to last bit of the remaining view screen segment identifiers. If the second to last bit is a "1," processing assigns a 25% start point fractional value to the respective view screen segments. Rows 325, 345, 365, and 385 include view screen segment identifiers with "1" as their second to last bit and, therefore, have an assigned start point fractional value of 25%.

Finally, processing checks the third to last bit of the remaining view screen segment identifiers. If it is a "1," processing assigns a 12.5% start point fractional value to the respective view screen segments. Rows 335 and 375 include view screen segment identifiers with "1" in their third to last bit and, therefore, have an associated start point fractional value of 12.5%.

Figure 6:
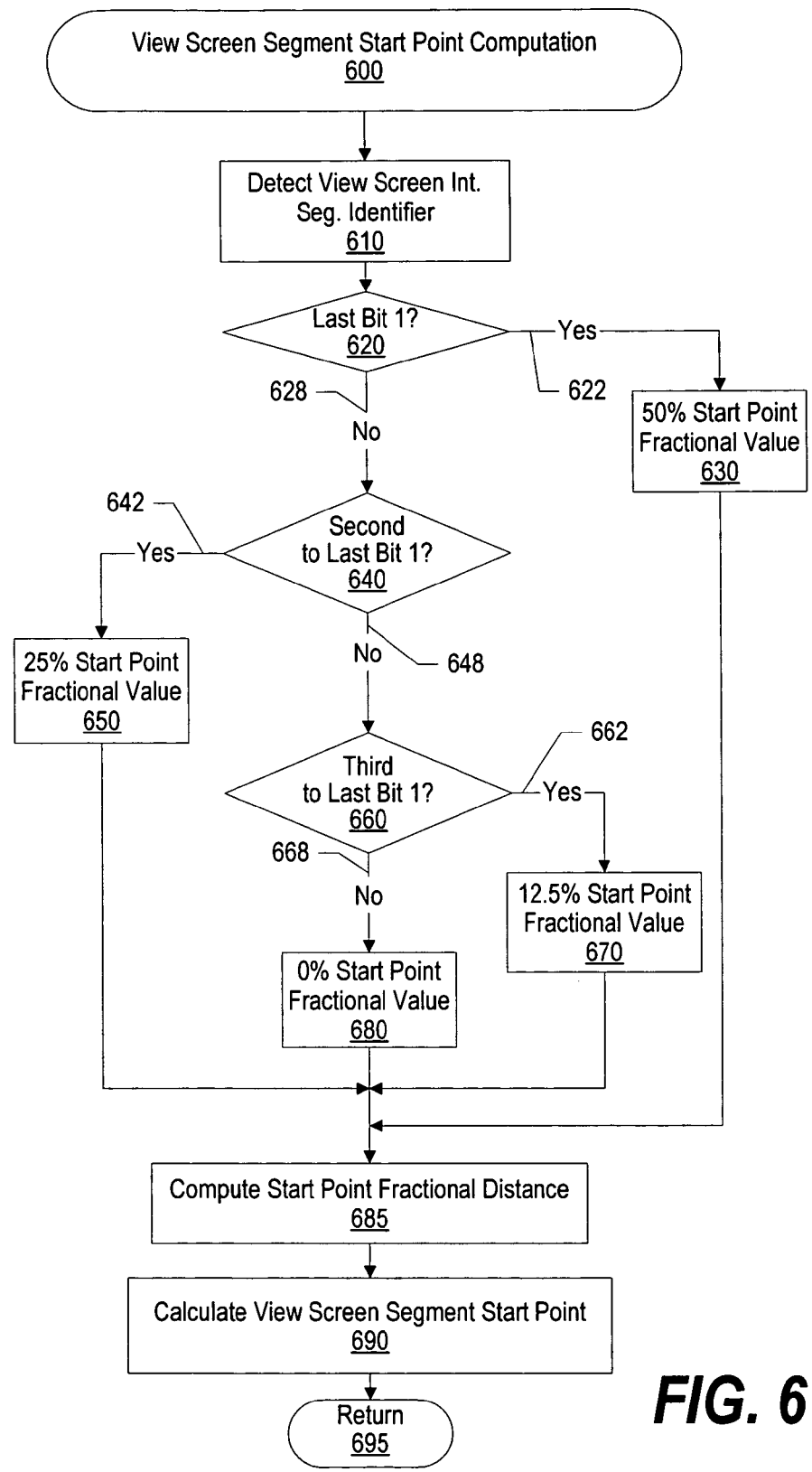
FIG. 6 is a flowchart showing steps taken in selecting a start point fractional value and calculating a view screen segment start point based upon the selected start point fractional value.

The remaining view screen segment identifiers start at the down point (or the bottom of the view screen edge), which are the view screen segment identifiers in rows 315 and 355 (see FIG. 6 and corresponding text for further details regarding fractional value assignments).

Figure 4:
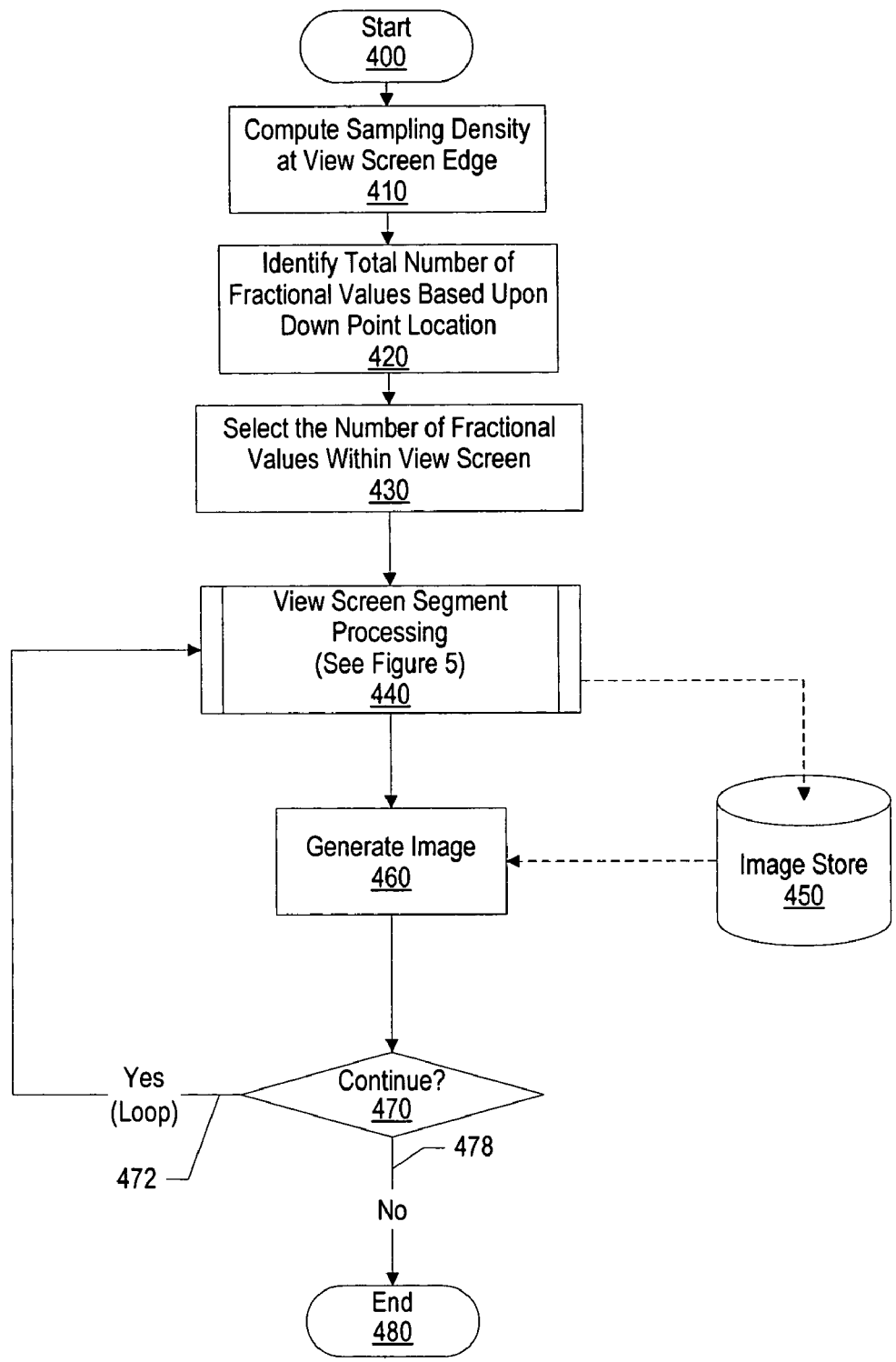
FIG. 4 is a high-level flowchart showing steps taken in identifying view screen segment start points and generating an image.

FIG. 4 is a high-level flowchart showing steps taken in identifying view screen segment start points and generating an image. Processing commences at 400, whereupon processing computes a sampling density, which corresponds to a view screen segment density, at a view screen edge at step 410. Processing computes the sampling density by identifying a view screen's pixel resolution and determining the required view screen segment density such that each of the view screen's pixels is "visited" by one or more of the view screen segments that, in turn, generates image values for each of the pixels.

At step 420, processing identifies a total number of start point fractional values based upon a down point location and at step 430, processing selects the number of fractional values of interest that are within the view screen. For example, if processing determines that there are four start point fractional values between the top of the view screen and the down point, but the fourth start point fractional value is below the bottom of the view screen, processing does not use the fourth start point fractional value in its computations.

Figure 5:
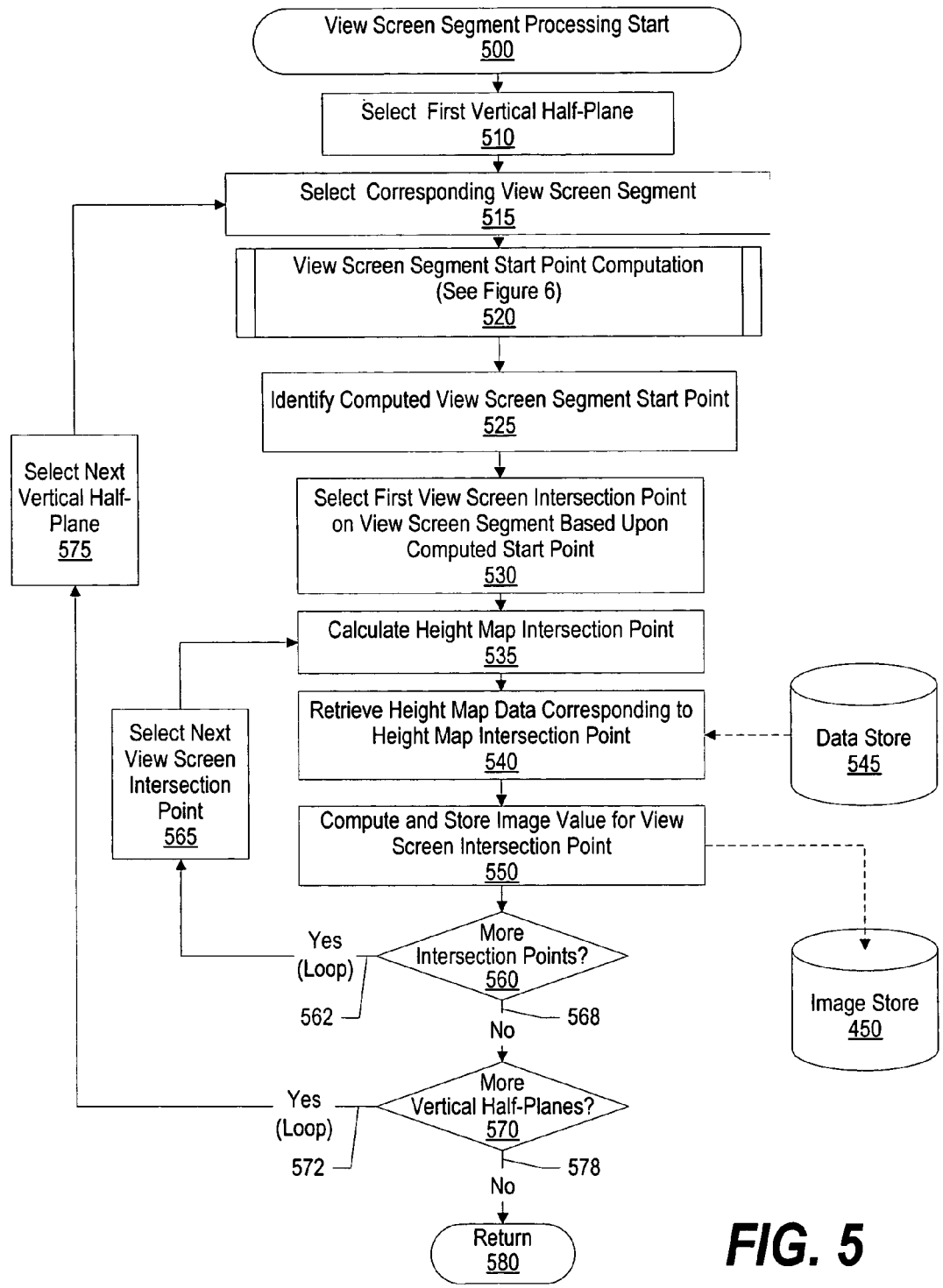
FIG. 5 is a flowchart showing steps taken in calculating view screen segment start points and image data.

Processing computes a view screen segment start point for each vertical half-plane, and generates image data for the corresponding view screen segments, which is stored in image store 450 (pre-defined process block 440, see FIG. 5 and corresponding text for further details). At step 460, processing generates an image from the image data that is stored in image store 450. Image store 450 may be stored on a nonvolatile storage area, such as a computer hard drive.

A determination is made as to whether to continue processing (decision 470). If processing should continue, decision 470 branches to "Yes" branch 472 which loops back to process more images. This looping continues until processing should terminate, at which point decision 470 branches to "No" branch 478 whereupon processing ends at 480.

FIG. 5 is a flowchart showing steps taken in calculating view screen segment start points and image data. Processing commences at 500, whereupon processing selects a first vertical half-plane at step 510. At step 515, processing selects a view screen segment that corresponds to the vertical half-plane.

Processing computes a view screen segment start point using a start point fractional value that corresponds to the view screen segment's identifier. The start point fractional values are those values whose locations reside within a view screen (pre-defined process block 520, see FIG. 6 and corresponding text for further details).

Processing identifies the computed view screen segment start point at step 525. At step 530, processing selects a first view screen intersection point on the view screen segment that corresponds to the computed view screen segment start point. In one embodiment, processing selects a plurality of view screen intersection points and, in this embodiment, a heterogeneous computer system, such as that shown in FIG. 7, may process multiple view screen intersection points in parallel.

At step 535, processing calculates a height map intersection point corresponding to the selected view screen intersection point. As one skilled in the art can appreciate, well know ray-tracing techniques may be used to perform the calculation. Processing retrieves height map data from data store 545 that corresponds to the calculated height map intersection point (step 540). At step 550, processing computes and stores image values in image store 450 for the view screen intersection point based upon the retrieved height map data. Data store 545 may be stored on a nonvolatile storage-area, such as a computer hard drive. Image store 450 is the same as that shown in FIG. 4.

A determination is made as to whether there are more view screen intersection points on the view screen segment to process (decision 560). If there are more view screen intersection points to process, decision 560 branches to "Yes" branch 562 which loops back to select (step 565) and process the next view screen intersection point. This looping continues until there are no more view screen intersection points to process for the view screen segment, at which point decision 560 branches to "No" branch 568.

A determination is made as to whether there are more vertical half-planes to process (step 570). If there are more vertical half-planes to process, decision 570 branches to "Yes" branch 572 which loops back to select (step 575) and process the next vertical half-plane. This looping continues until there are no more vertical half-planes to process, at which point decision 570 branches to "No" branch 578 whereupon processing returns at 580.

FIG. 6 is a flowchart showing steps taken in selecting a start point fractional value and calculating a view screen segment start point based upon the selected start point fractional value. The view screen segment start point is the point at which processing starts computing image values for a particular view screen segment. The example shown in FIG. 6 corresponds to three start point fractional values, which are 50%, 25%, and 12.5%. As one skilled in the art can appreciate, more or less start point fractional values may be used to calculate view screen segment start points.

Processing commences at 600, whereupon processing detects the view screen segment's identifier at step 610. The view screen segment identifier identifies the relative location of the view screen segment. For example, moving from left to right along a view screen, the first view screen segment identifier may be "0,", the second view screen segment identifier may be "1," the third view screen segment identifier may be "2," and so on.

A determination is made as to whether the last bit of the view screen segment identifier is "1" (decision 620), which corresponds to every other view screen segment (see FIG. 3 and corresponding text for further details). If the last bit of the view screen segment identifier is 1, decision 620 branches to "Yes" branch 622 whereupon processing uses a 50% start point fractional value for computations, which corresponds to a start point that is half way between the view screen edge and the down point (step 630). On the other hand, if the view screen segment identifier's last bit is not "1," decision 620 branches to "No" branch 628.

A determination is made as to whether the second to last bit of the view screen segment is "1" (decision 640).

If the second to last bit of the view screen segment identifier is "1," decision 640 branches to "Yes" branch 642 whereupon processing uses a 25% start point fractional value for computations, which corresponds to a start point that is 25% away from the down point relative to the view screen edge (step 650). On the other hand, if the view screen segment identifier's second to last bit is not "1," decision 640 branches to "No" branch 648.

A determination is made as to whether the third to last bit of the view screen segment identifier is "1" (decision 660). If the third to last bit of the view screen segment identifier is "1," decision 660 branches to "Yes" branch 662 whereupon processing uses a 12.5% start point fractional value for computations, which corresponds to a start point that is 12.5% away from the down point relative to the view screen edge (step 670). On the other hand, if the view screen segment identifier's third to last bit is not "1," decision 660 branches to "No" branch 668 whereupon processing uses a 0% start point fractional value at step 680, which corresponds to the down point.

Processing computes a start point fractional distance at step 685 by multiplying the start point fractional value with the distance between the down point and the view screen edge. For example, if the down point is at an XY location of (10,10) and the view screen edge corresponding to the view screen segment is at an XY location of (10,60), the distance between the two is (0,50). Continuing with this example, if the view screen segment start point fractional value is 50%, the computed start point fractional value is (0,25).

Processing then, at step 690, calculates the view screen segment start point by adding the start point fractional distance to the down point location. Continuing with this example, processing adds (0,25) to (10,10), which results in a view screen segment start point of (10,35). Processing returns at 695.

Figure 7:
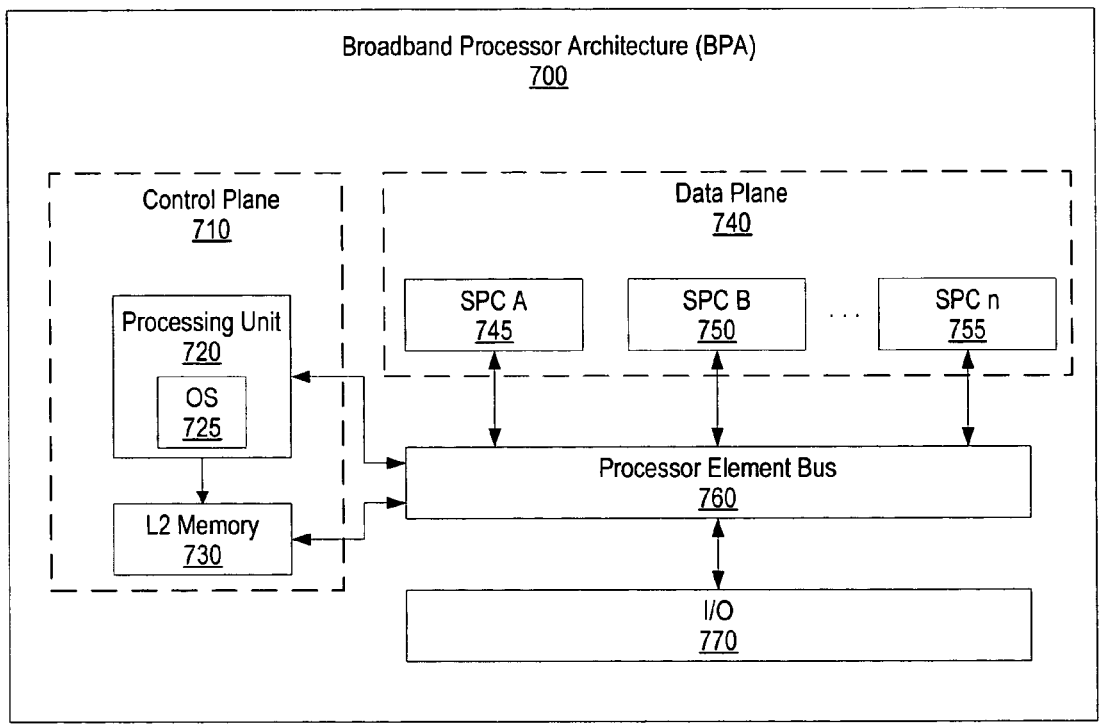
FIG. 7 is a block diagram of a computing device capable of implementing the present invention.

FIG. 7 illustrates an information handling system, which is a simplified example of a computer system capable of performing the computing operations described herein.

Broadband Processor Architecture (BPA) 700 includes a plurality of heterogeneous processors, a common memory, and a common bus. The heterogeneous processors are processors with different instruction sets that share the common memory and the common bus. For example, one of the heterogeneous processors may be a digital signal processor and the other heterogeneous processor may be a microprocessor, both sharing the same memory space.

BPA 700 sends and receives information to/from external devices through input output 770, and distributes the information to control plane 710 and data plane 740 using processor element bus 760. Control plane 710 manages BPA 700 and distributes work to data plane 740.

Control plane 710 includes processing unit 720, which runs operating system (OS) 725. For example, processing unit 720 may be a Power PC core that is embedded in BPA 700 and OS 725 may be a Linux operating system. Processing unit 720 manages a common memory map table for BPA 700. The memory map table corresponds to memory locations included in BPA 700, such as L2 memory 730 as well as non-private memory included in data plane 740.

Data plane 740 includes Synergistic Processing Complex's (SPC) 745, 750, and 755. Each SPC is used to process data information and each SPC may have different instruction sets. For example, BPA 700 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU). An SPU is preferably a single instruction, multiple data (SIMD) processor, such as a digital signal processor, a microcontroller, a microprocessor, or a combination of these cores. In a preferred embodiment, each SPU includes a local memory, registers, four floating-point units, and four integer units. However, depending upon the processing power required, a greater or lesser number of floating points units and integer units may be employed.

SPC 745, 750, and 755 are connected to processor element bus 770, which passes information between control plane 710, data plane 740, and input/output 770. Bus 760 is an on-chip coherent multi-processor bus that passes information between I/O 770, control plane 710, and data plane 740. Input/output 770 includes flexible input-output logic which dynamically assigns interface pins to input output controllers based upon peripheral devices that are connected to BPA 700.

Figure 8:
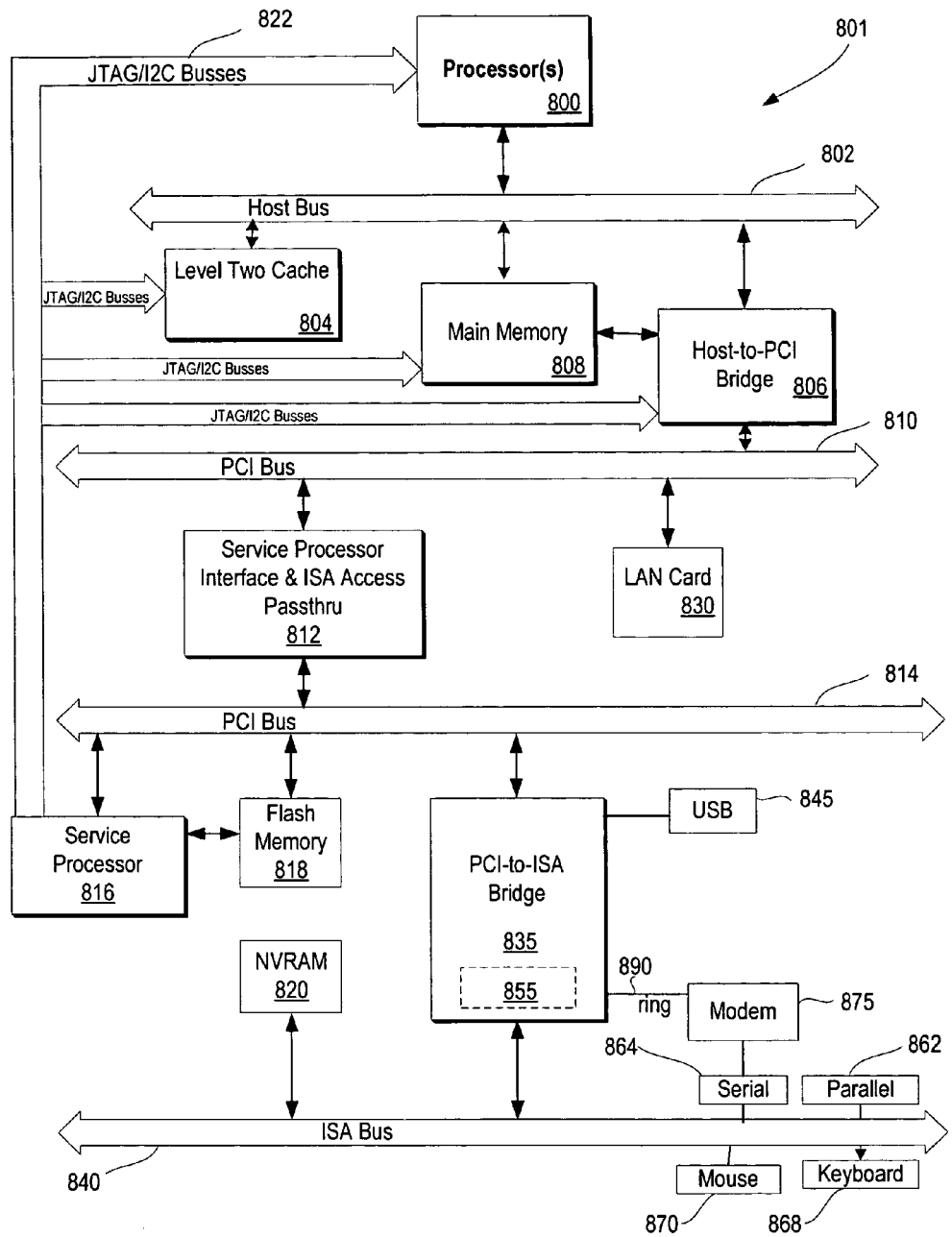
FIG. 8 is another block diagram of a computing device capable of implementing the present invention.

FIG. 8 illustrates information handling system 801 which is a simplified example of a computer system capable of performing the computing operations described herein. Information handling system 801 includes processor 800, which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 885 is connected to serial port 864 and PCI-to-ISA Bridge 835.

While FIG. 8 shows one information handling system that employs processor(s) 800, the information handling system may take many forms. For example, information handling system 801 may take the form of a desktop, server, portable, laptop, notebook, or other form factor computer or data processing system. Information handling system 801 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the. present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   identifying a down point location;
   determining one or more start point fractional values based upon the down point location;
   selecting one of the start point fractional values for a view screen segment, wherein the selecting further comprises:
      identifying a view screen segment identifier that corresponds to the view screen segment;

determining a last bit value of the view screen segment identifier;

selecting a fifty percent start point fractional value in response to determining that the last bit value is one;

in response to determining that the last bit value is zero, determining a second to last bit value of the view screen segment identifier;

selecting a twenty five percent start point fractional value in response to determining that the second to last bit value is one;

in response to determining that the second to last bit value is zero, determining a third to last bit value of the view screen segment identifier; and selecting a twelve and one-half percent start point fractional value in response to determining that the third to last bit value is one;

computing a view screen segment start point using the selected start point fractional value;

generating image values corresponding to the view screen segment starting at the view screen segment start point; and displaying the image values on a view screen.

2. The method of claim 1 wherein the computing further comprises:

identifying the distance between the down point location and a view screen edge that corresponds to the view screen segment;

multiplying the selected start point fractional value with the identified distance, resulting in a start point fractional distance; and adding the start point fractional distance to the down point location, resulting in the view screen segment start point.

3. The method of claim 1 wherein the determining further comprises:

identifying the start point fractional values that are located within the view screen.

4. The method of claim 1 further comprising:

selecting a view screen intersection point based upon the view screen segment start point;

calculating a height map intersection point based upon the selected view screen intersection point;

retrieving height map data corresponding to the calculated height map intersection point; and wherein the generation of the image values includes the retrieved height map data.

5. The method of claim 1 further comprising:

identifying a pixel resolution corresponding to a plurality of pixels included in the view screen;

determining a view screen segment density for a plurality of view screen segments based upon the pixel resolution, the view screen segment included in the plurality of view screen segments; and wherein the view screen segment density ensures that one or more of the plurality of view screen segments corresponds to generating image values for each of the plurality of pixels.

6. The method of claim 1 further comprising:

wherein the method is performed using a broadband processor architecture, the broadband processor architecture including a plurality of heterogeneous processors, a common memory, and a common bus; and wherein the plurality of heterogeneous processors use different instruction sets and share the common memory and the common bus.

* * * * *